United States Patent [19]

Hunker

[11] Patent Number: 5,791,670
[45] Date of Patent: Aug. 11, 1998

[54] ARTICLE CARRYING DEVICE

[76] Inventor: David B. Hunker, P.O. Box 1184, Salem, Ohio 44460

[21] Appl. No.: 389,654

[22] Filed: Feb. 16, 1995

[51] Int. Cl.[6] .................................................. B62B 1/04
[52] U.S. Cl. .......................... 280/204; 280/30; 280/645; 280/652; 280/47.32
[58] Field of Search ............................... 280/204, 292, 280/30, 32.7, 39, 638, 38, 645, 652, 654, 656, 659, 43.1, 47.18, 47.21, 47.3, 47.32, 78, 64, 79.3

[56] References Cited

U.S. PATENT DOCUMENTS

| 2,401,986 | 6/1946 | Talbott | 280/645 |
| 2,484,677 | 10/1949 | Binz | 280/47.3 |
| 3,054,622 | 9/1962 | Davis et al. | 280/645 |
| 5,076,600 | 12/1991 | Fake | 280/204 |
| 5,098,113 | 3/1992 | Albitre | 280/204 |
| 5,301,963 | 4/1994 | Chen | 280/204 |
| 5,348,327 | 9/1994 | Gieske | 280/204 |

FOREIGN PATENT DOCUMENTS

| 0162420 | 7/1948 | Austria | 280/652 |
| 0066522 | 3/1895 | United Kingdom | 280/30 |

*Primary Examiner*—Anne Marie Boehler
*Attorney, Agent, or Firm*—Foley & Lardner

[57] ABSTRACT

A method and apparatus for converting a backpack into a bicycle trailer are provided. The apparatus consists of a frame for a pack, the frame containing at least one wheel. The wheel can be placed in one position for using the apparatus as a backpack and in another position for use of the apparatus as a trailer, such as a bicycle trailer. Alternately, two or more wheels can be removed from the frame when a backpack configuration is desired, and be attached to the frame when a trailer configuration is desired.

1 Claim, 8 Drawing Sheets

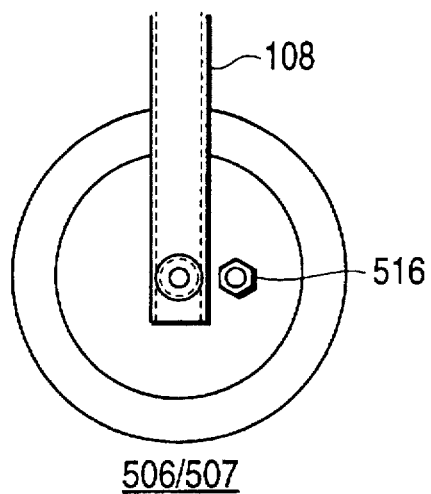
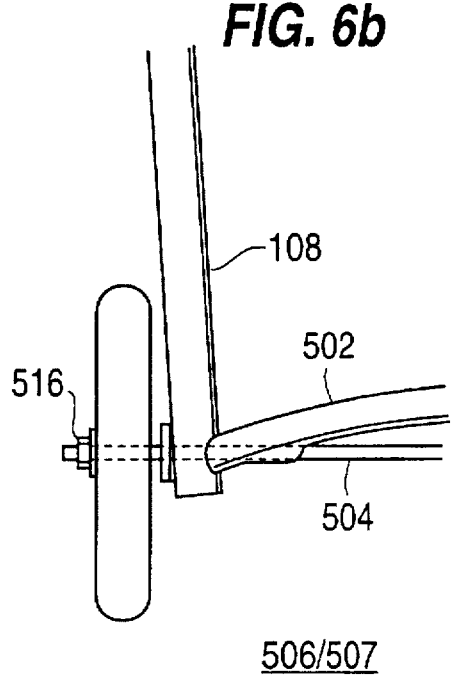
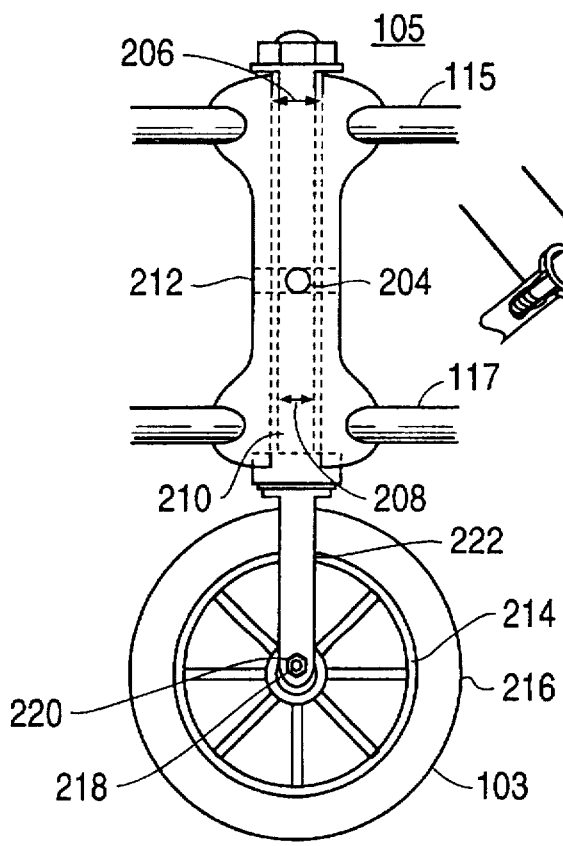
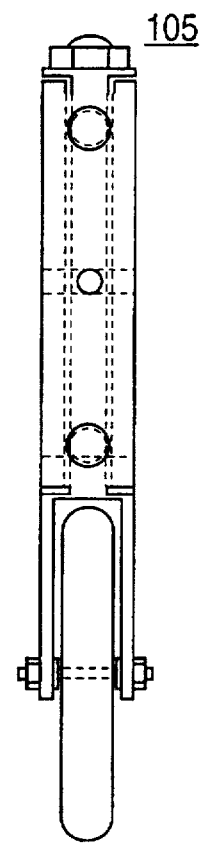

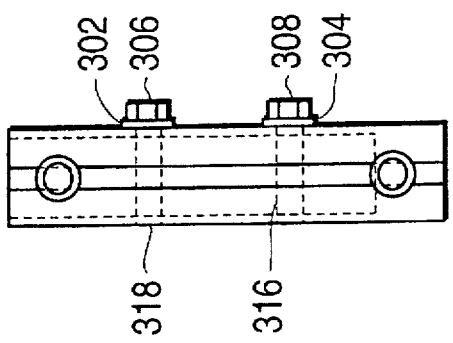
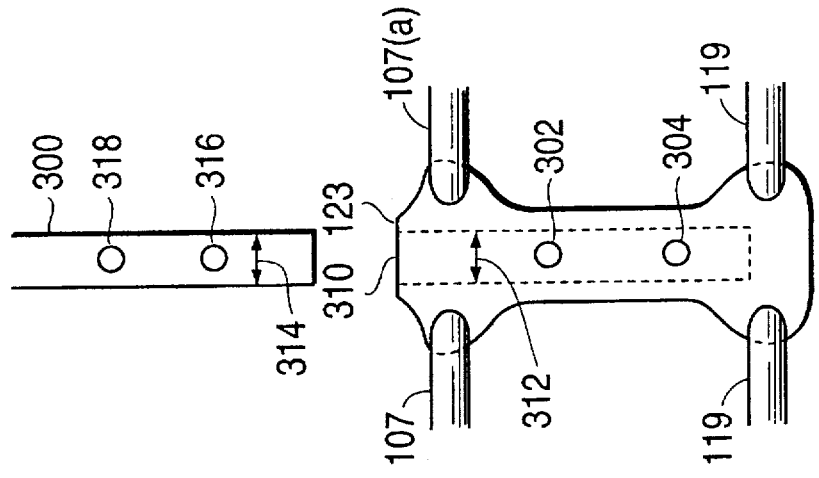

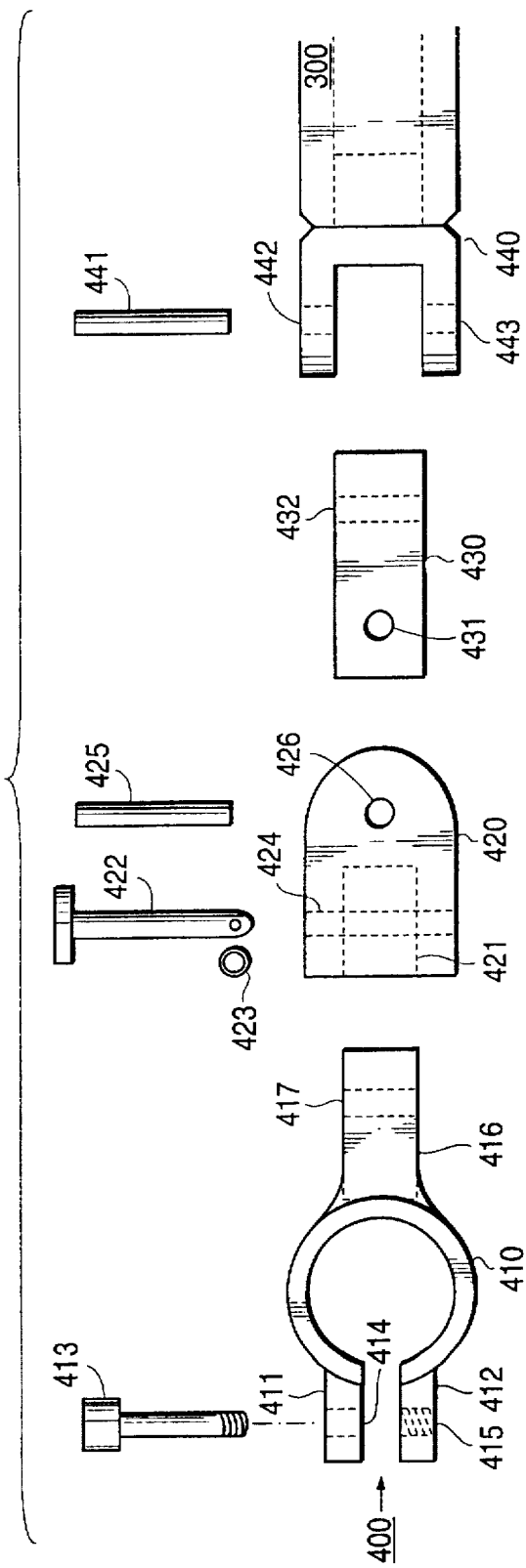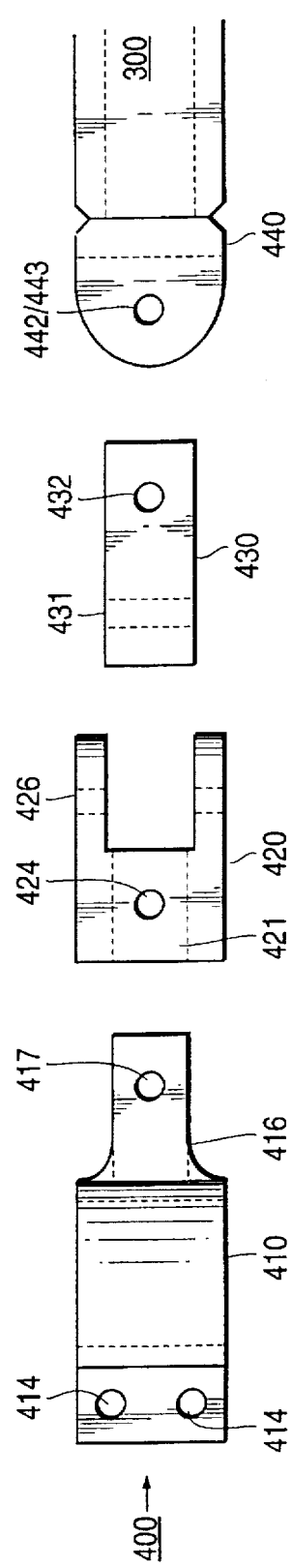
FIG. 4a
FIG. 4b

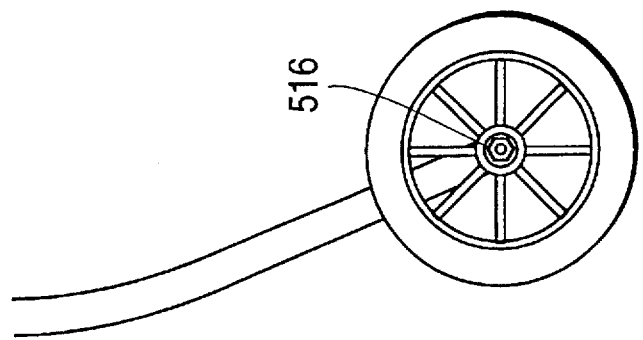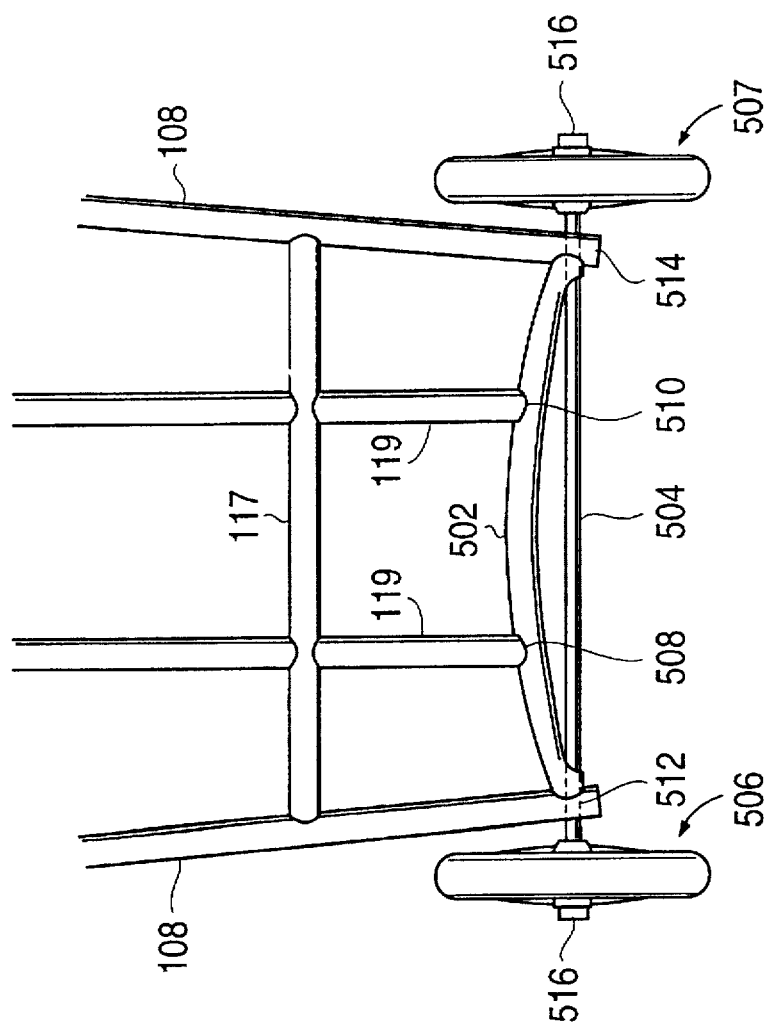

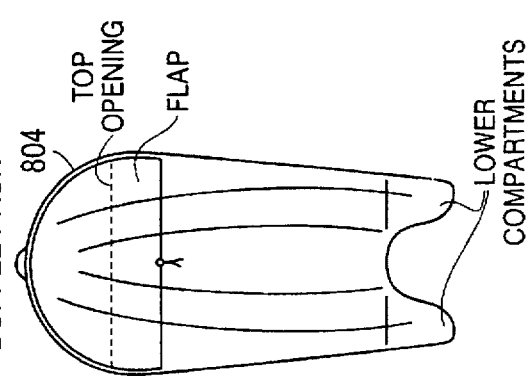
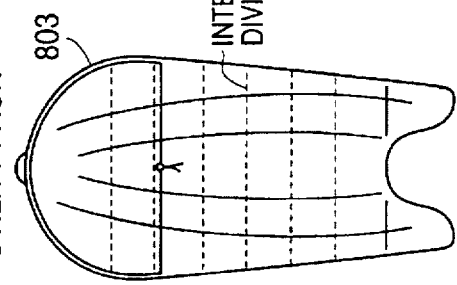
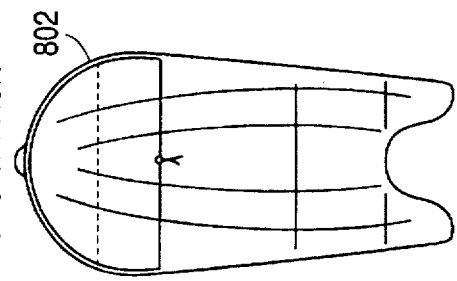
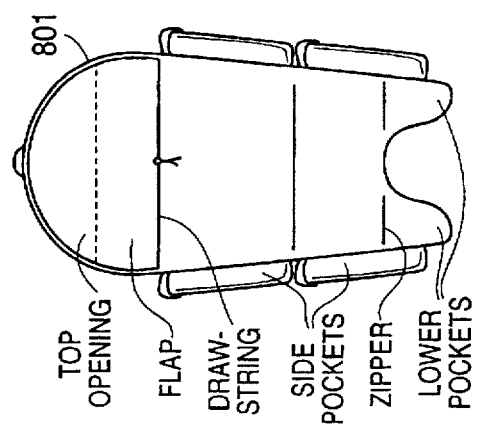
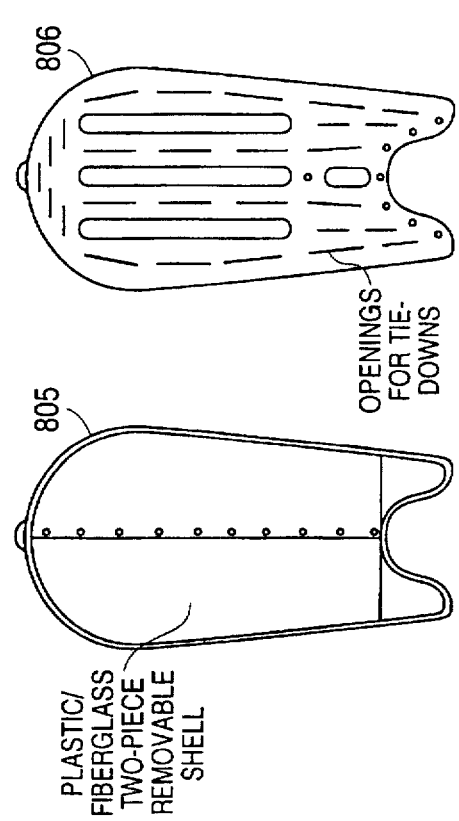

5,791,670

ARTICLE CARRYING DEVICE

BACKGROUND OF THE INVENTION

1. Field of the Invention

This invention relates to pack carrying apparatuses, such as those used by hikers. In particular, the invention relates to a supporting frame for a pack, such as a backpack, wherein the frame can be reconfigured as a wheeled trailer to be pulled by a bicycle or other vehicle.

2. Description of the Prior Art

The conventional backpack employed by hikers typically accommodates only one mode of use. In this mode the backpack is carried upon the hiker's back. Typically, the hiker uses a harness which is attached to the backpack frame. If, during the hiker's trip, the hiker mounts a bicycle, or other similar vehicle, the backpack must still be carried on the hiker's back while bicycling. In addition to discomfort carrying the backpack causes the hiker, operating the bicycle in this fashion can prove dangerous, if not impossible. Others have modified backpacks for use as wheelbarrows or other similar hand pushed carts. However, no one has addressed the needs of the hiker who will also be mounting a bicycle or the needs of a biker who will be hiking in conjunction with his bicycle activities.

SUMMARY OF THE INVENTION

It is therefore an object of this invention to provide a frame for carrying a pack, such that the pack can be carried in a conventional manner by a hiker, and such that the frame can be easily reconfigured to be pulled by a bicycle as a trailer.

It is a further object of this invention to provide a bicycle trailer which can be operated in the conventional manner, and which can be easily reconfigured to be carried as a backpack.

It is another object of this invention to provide a method for attaching a backpack or frame to a bicycle.

It is also an object of this invention to provide a backpack frame which can be easily reconfigured to be used as a bicycle trailer frame.

It is a further object of this invention to provide a variety of backpacks attachable to the frame which can thus be converted into a variety of trailers, including a sport pack, a utility pack, a duffel pack, a hardshell pack, an open rack, and a child seat carrier. Thus, as used herein, the terms "backpack" and "pack" are used by way of illustration and not limitation, and these terms include a wide variety of hard and soft packs, as will be known to those of ordinary skill.

These and other objects of the invention will become clear to those skilled in the art upon analysis of the figures, and the following description.

The above described needs of hikers and bikers are addressed by providing a backpack supporting frame according to the invention which can be carried by a hiker and then reconfigured as a trailer to be pulled by a bicycle. In the first configuration according to the invention, the frame contains a single wheel which is permanently attached thereto. This single wheel can be placed in one position to allow for comfortable carrying of the backpack, and in another position to allow the backpack to be transported by a vehicle such as a bicycle. In a second configuration according to the invention, no wheels are permanently attached to the backpack. In this configuration, two wheels and an accompanying axle are attached to the backpack when it is to be used as a trailer and may be removed or left attached when the pack is to be carried by the individual. In this way, the hiker can carry the wheels and axle inside the backpack along with other items the hiker keeps in the backpack, or the hiker may leave the wheels and axle attached. If the wheels are removed, the hiker can subsequently attach them to the backpack frame when converting the backpack into a trailer.

In accordance with the invention, a support frame is provided, comprising a pack supporting section and a vehicle attachment section. The pack supporting section has a wheel attachment section which includes means for attaching a wheel. The wheel can then carry the pack supporting section when it is attached to a vehicle via a link of said vehicle attachment section.

Also in accordance with the invention, a bicycle trailer system is provided. The bicycle trailer system has a trailer section and a bicycle attachment section. The trailer section has a wheel attachment section and a pack section. The wheel attachment section includes means for attaching a wheel on which the trailer section can travel. The pack section can be detached from the trailer section and be used as a backpack, or it can be attached to the trailer section and be used as a trailer pack. The bicycle attachment section provides a link for connecting the trailer section to a bicycle.

Also provided, in accordance with the invention, is a method for attaching a backpack to a vehicle for use as a trailer. The method comprises the steps of adjusting a wheel of the backpack to a position in which it can operate in the same axis as the wheels of the vehicle, attaching a hitch assembly to the vehicle, and attaching the backpack to the hitch assembly.

BRIEF DESCRIPTION OF THE DRAWINGS

The features and advantages of the present invention will become more clearly appreciated from the following description taken in conjunction with the accompanying drawings in which:

FIGS. 2a and 2b show a close-up of the wheel assembly of the monowheel configuration;

FIGS. 3a and 3b provide a close-up of a portion of the frame that mates with the hardware used for attaching the frame to a bicycle;

FIGS. 4a and 4b illustrate a hitch assembly used for attaching the frame to a bicycle;

FIGS. 5a, 5b, 6a and 6b illustrate the two wheel configuration;

FIGS. 8a–8g show various alternative pack configurations of the trailer.

DETAILED DESCRIPTION OF THE PREFERRED EMBODIMENTS

Figure 1A:
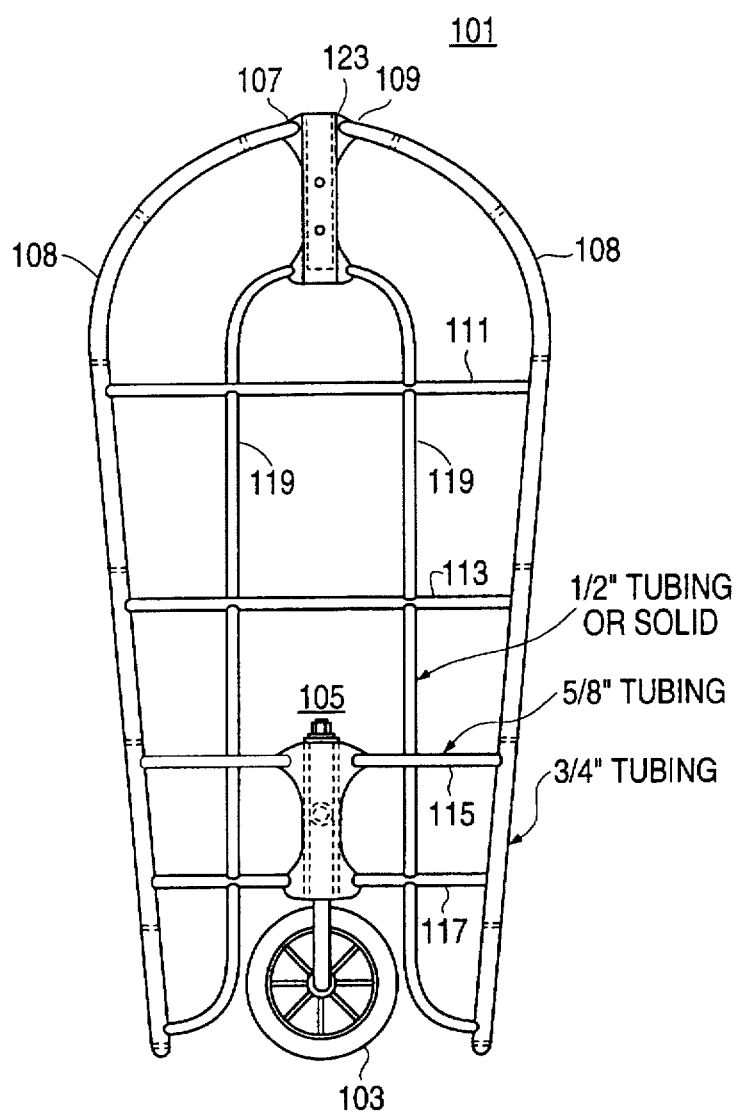
FIG. 1a shows a monowheel configuration of a frame according to the invention with the wheel positioned for use as a backpack.
Figure 1B:
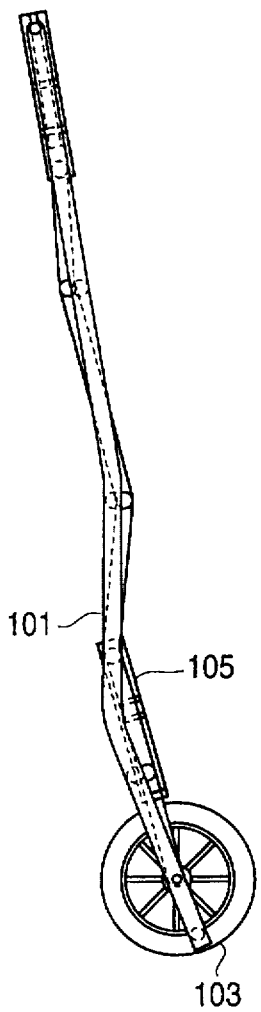
FIG. 1b shows a side view of the frame of FIG. 1, with the wheel positioned for use as a trailer.

FIG. 1a displays a portion of a monowheel configuration of a support frame according to the invention. In this figure, frame 101 is a backpack frame which has therein wheel assembly 103. Frame 101 is contoured to comfortably fit the back of a hiker carrying the backpack. Wheel assembly 103 is centrally attached to the frame by headset 105. Headset 105 allows the wheel assembly 103 to swivel and lock into a first position as shown in FIG. 1a allowing a user to carry a pack attached to the frame. A second wheel position which is typically perpendicular to the first position is for using the frame as a trailer as shown in FIG. 1b which is a side view of the frame of FIG. 1a with the wheel in the second position. Headset 105 and wheel assembly 103 can be viewed as a wheel attachment section, wherein headset 105 and wheel assembly 103 include means for attaching a wheel to frame 101.

Referring back to FIG. 1a, the frame has an external structural support element 108, made, for example, of ¾ inch aluminum tubing. The external structural support element 108 traverses through the tongue receptacle 123 at point 107 and 109. Element 108 is also connected to both ends of cross elements 111, 113, 115 and 117. Internal support element 119 runs from the lower left portion of external structural support element 108, to which it is attached, through cross elements 117, 115, 113 and 111, and then through the left side of the tongue receptacle 123 through the right side of the tongue receptacle 123 and back down through the cross elements 111, 113, 115 and 117 until finally terminating at the connection with the right portion of external structural support element 108.

Cross elements 111, 113, 115 and 117 are made, for example, of ⅝" aluminum tubing. Internal support element 119 is made, for example, of ½" aluminum tubing, or of a ½" solid or another appropriately dimensioned material. The dimensions given herein are all by way of example and not by way of limitation.

Figure 1C:
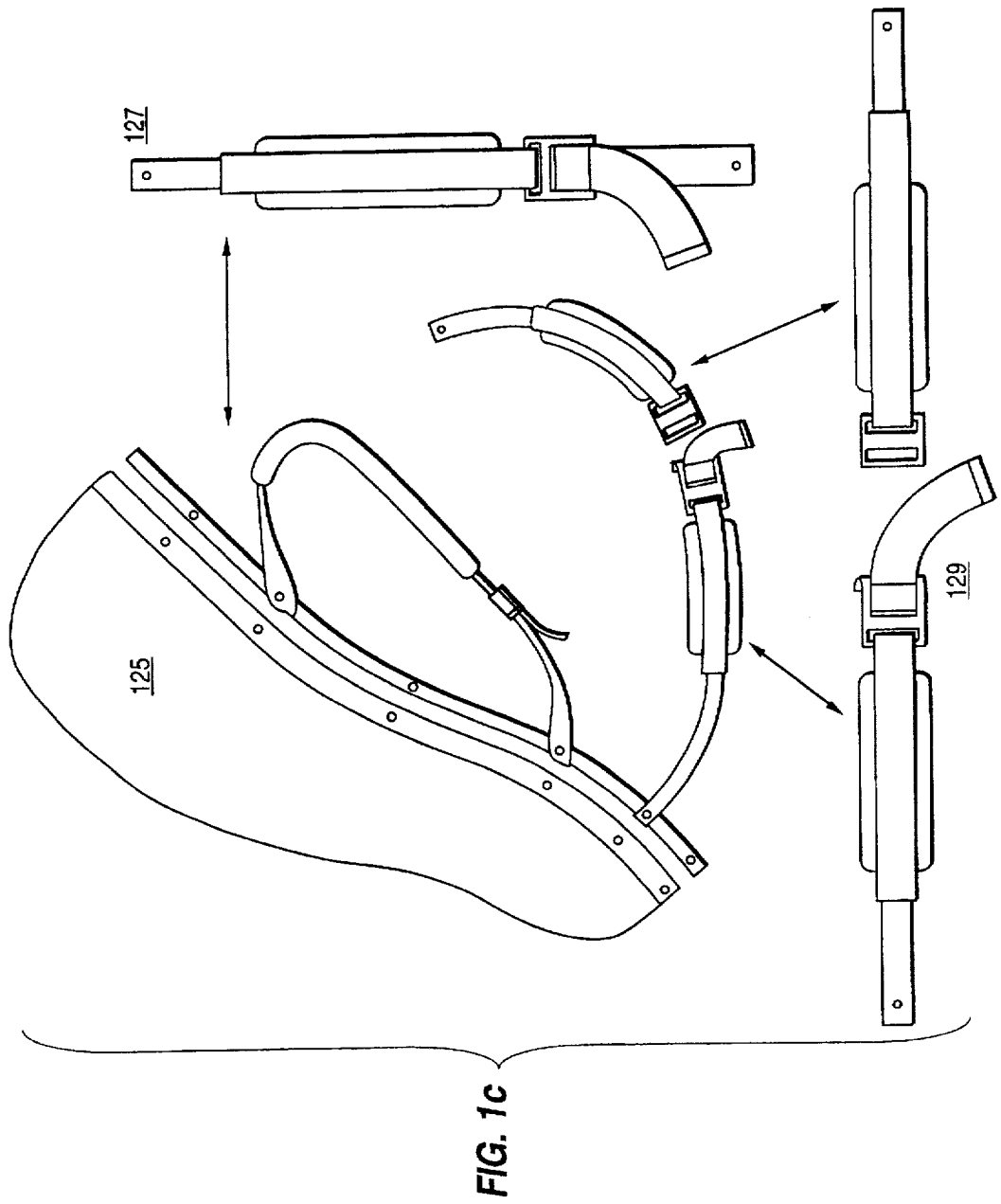
FIG. 1c shows the frame with attached pack and straps of the monowheel configuration.

In operation, a pack is attached to frame 101, as shown in FIG. 1c. Pack 125, shoulder straps 127 (only one strap is shown in FIG. 1c since the other strap is immediately behind it) and waist belt 129 are attached to the frame. The shoulder straps 127 preferably comprise straps, padding and tightener whereas the waist belt preferably comprises straps, padding, a buckle clip and tightener. To carry the backpack (hereinafter, the term "backpack" refers to the attached combination of the frame 101, the pack 125, the straps 127 and belt 129), a hiker places each arm through one of the openings between the straps 127 and the frame 101 such that the backpack is upon his back. Straps 127 may be adjustable in length to provide for a comfortable fit of the backpack upon the user's back. Waist belt 129 may be similarly adjustable in length to provide for a comfortable fit of the backpack upon/around the user's waist. When carrying the backpack, wheel assembly 103 is placed in the position shown in FIG. 1a.

FIGS. 2a and 2b show a closeup of the wheel assembly 103 and headset 105 of the monowheel configuration. As can be seen in FIG. 2a, pin 202 is removed from pin receptacle 204 when the frame is to be used as a backpack carryable by a hiker. This allows wheel assembly 103 to be repositioned into the position shown in FIG. 2a and re-pinned, thus providing the most comfortable position for the hiker. When a trailer configuration is desired, wheel assembly 103 is rotated about 90° from the position shown in FIG. 2a to that shown in FIG. 1b. To maintain the wheel assembly in this position, pin 202 is inserted into pin receptacle 204. Thus, when connected to a bicycle, wheel assembly 103 is in the same plane of rotation as the wheels of the bicycle.

Headset 105 is preferably made from pressed aluminum sheeting, forged with an internal cavity 206 (typically cylindrical) with a diameter which is slightly larger than the external diameter 208 of wheel post 210. Wheel post 210 is preferably constructed of a solid, strong material such as steel, except for a hole running completely therethrough, designed such that it aligns with pin receptacle 204 when the wheel is placed in the position for use as a trailer (as shown in FIG. 1b) to be locked in position by pin 202, or to align with pin receptacle 212 to be locked into position by pin 202 for use as a backpack (as shown in FIG. 1a).

Wheel assembly 103 includes wheel 214 and a tire 216. The wheel 214, preferably constructed of either plastic or aluminum, is attached by threaded axle 218 and holes 220 to wheel tongue 222, which is connected to wheel post 210. Thus, by rotating the tire 216 and wheel 214 about a vertical (or longitudinal) axis, wheel tongue 222 and wheel post 210 will similarly rotate, thus permitting the user to align the hole with either pin receptacle 204 or 212 for locking the wheel assembly in place, such that the wheel assembly cannot be further rotated about the longitudinal axis. Tire 216 can be either solid or inflatable, such as solid rubber, a rubber exterior encasing an air-filled tube or other suitable tire.

FIGS. 3a and 3b are a closeup of the tongue receptacle 123 in both a front and side view, respectively. These figures show tongue cavity 310 into which the tongue 300 from the hitch and tongue assembly can be inserted. Holes 302 and 304, which are preferably ¼" holes, will align with like holes 316 and 318 in the tongue 300 when the tongue is inserted in the tongue cavity 310. At that time, bolts can be inserted into holes 302 (and 318) and 304 (and 316) to lock the tongue into the tongue cavity by being tightened into nuts 306 and 308 which have preferably been previously attached by, for example, welding.

Tongue receptacle 123 is preferably made of pressed aluminum. Tongue cavity 310 consists of a cylindrical hole in tongue receptacle 123 such that the internal diameter 312 of tongue cavity 310 is slightly larger than the external diameter 314 of tongue 300. This allows tongue 300 to be easily inserted into and removed from tongue cavity 310.

FIGS. 4a and 4b show the hitch assembly 400, which along with tongue 300 and tongue receptacle 123 can be viewed as a vehicle attachment section. FIG. 4a is a top view and FIG. 4b is a side view of the hitch assembly. As the figures show, one type of hitch assembly which can be used to practice the invention is comprised of four main parts: seat post receptacle 410, collar 420, post 430 and tongue extension 440.

Seat post receptacle 410 is dimensioned to fit around the seat post of the bicycle. It is connected to the bicycle by opening arms 411 and 412 to fit seat post receptacle 410 around the seat post. Seat post receptacle 410 is sufficiently flexible to allow a user to separate arms 411 and 412 enough to fit the seat post therebetween and then return to their normal position (as shown in FIG. 4a). Bolts 413 are used to close seat post receptacle 410 into a fixed position around the seat post. Bolts 413, in the configuration shown in the figure, are placed through holes 414 and threaded into threaded holes 415. Alternatively, hole 415 could also be a through-hole and bolt 413 would thread into a nut placed below hole 415 (in the orientation shown in FIG. 4a).

Seat post receptacle 410 has a post 416 which engages with cavity 421 of collar 420. Post 416 is preferably a ½ in by ½ inch square, with cavity 421 being dimensioned slightly larger. Post 416 is held in place within cavity 421, for example, by pin 422 and ring 423. As shown, to connect collar 420 to post receptacle 410, one would insert pin 422 into hole 424 at collar 420, through hole 417 of post receptacle 410, through the other side at hole 424 of collar 420, and finally through ring 423. Alternatively, ring 423 could be permanently affixed to collar 420 at an opening of hole 424 on one side of collar 420. Pin 422 could then be pushed through from the other side.

Seat post receptacle 410 can thus be easily engaged with and disengaged from collar 420 by insertion of end removal of pin 422.

Collar 420 is "permanently" pinned to post 430 by pin 425 through holes 426 and 431. Post 430 is preferably a ¾ inch by ¾ inch square solid. Post 430 is similarly "permanently" pinned to tongue extension 440 by pin 441 through holes 442, 432 and 443.

This hitch assembly is similar to a standard tool socket set universal elbow, yet maintains an in-line stability for the trailer which prevents the trailer from "falling" from side to side while allowing for left/right turns and up/down movements.

Operationally, when the invention is to be used as a backpack, seat post receptacle 410 remains attached to the bicycle. On the other hand, when conversion to a trailer is desired, the following steps are taken: tongue 300 is inserted into tongue cavity 310 (FIG. 3a) and bolted thereto by bolts 306 and 308 which are inserted into holes 302 and 304, and collar 420 is pinned to seat post receptacle 410 by pin 422. Wheel assembly 103 is rotated to align hole 212 and pin receptacle 204, and pinned in place by pin 202 (FIG. 2a).

FIG. 5 depicts a two-wheel configuration according to the invention. In FIG. 5, structural support element 108 is identical to that shown in FIG. 1a. Cross element 117 is also identical to the cross element shown in FIG. 1a. However, a centrally located headset as shown at 105 in FIG. 1a does not appear in the tubular configuration of FIG. 5. Instead, in the embodiment shown in FIG. 5, the base of the frame consists of element 502 which connects to the left base of the structural support element 108 and to the right base of the structural support element 108. Internal support element 119 is connected at points 508 and 510 to base cross element 502. Holes 512 and 514 are provided at the left and right base of the structural support element 108. These holes accommodate the insertion of axle 504 and the attachment of wheels 506 and 507 thereto with bolts 516. Holes 512 and 514, axle 504, wheels 506 and 507, and bolts 516 can also be viewed on a wheel attachment section, wherein axle 504 and bolt 516 is considered a wheel attaching means.

Therefore, when use of the device as a trailer is desired, the wheels are attached to either side of the frame. Subsequently, when the device is to be used as a backpack, the wheels and axle may optionally be removed. If removed, the wheels and axle can be stored in the backpack or can be left with the bicycle. FIGS. 6a and 6b show a closeup view of one of the wheels 506 and 507 along with axle 504 and bolt 516 and the frame elements 108 and 502. At the connection points of element 108 and element 502, additional structural support might be included. Preferably, this additional support consists of solid aluminum with holes 512 and 514 passing therethrough.

Figure 7:
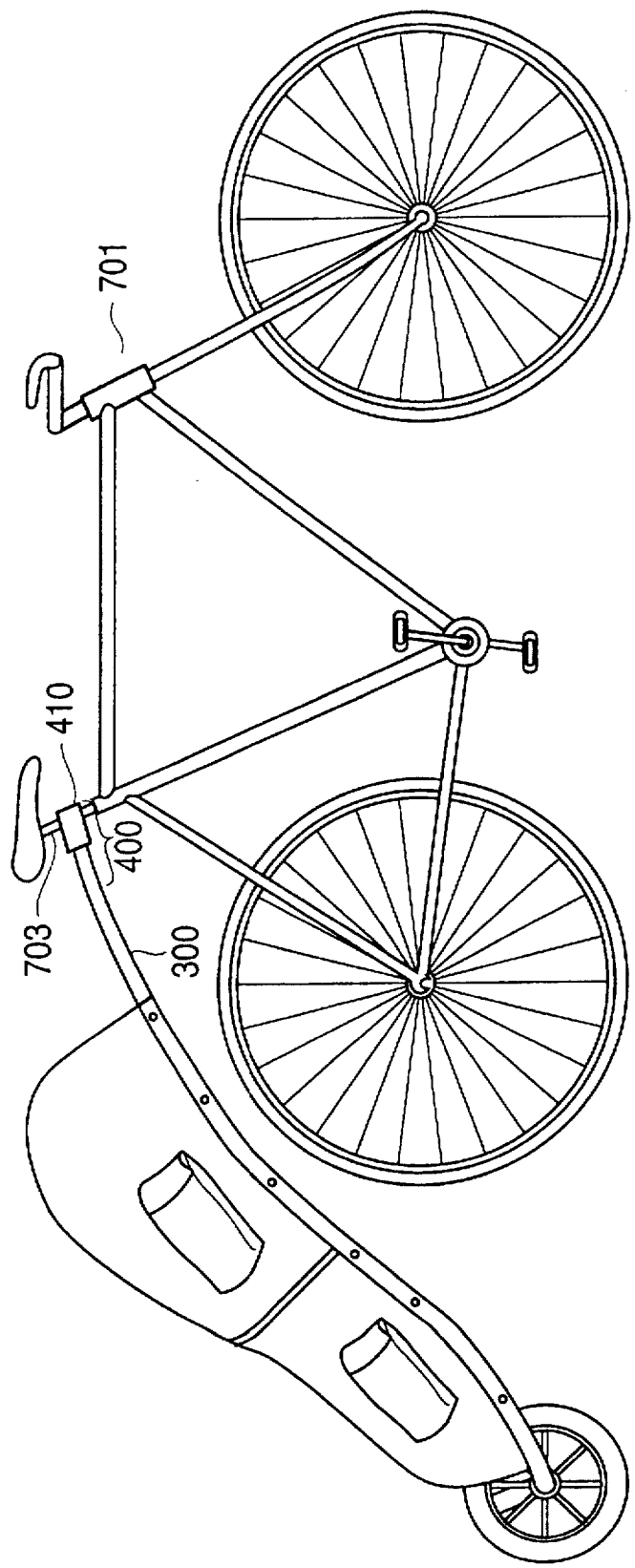
FIG. 7 shows the frame according to the invention configured as a trailer attached to a bicycle.

FIG. 7 shows the system in use in a trailer configuration. Seat post receptacle 410 is connected to bicycle 701 on the seat post 703. Tongue 300 and the remaining elements of hitch assembly 400 (collar 420, post 430 and tongue extension 440—shown for simplicity as hitch assembly 400) are connected with seat post receptacle 410 as described earlier. The tongue 412 is connected to the tongue receptacle which is behind the backpack and not visible in FIG. 7. In the monowheel configuration, the wheel assembly 103 is pinned in place such that the wheel 214 is in the same rotational axis as the wheels of the bicycle. In the two-wheel configuration, wheels 506 and 507 are connected to the frame via axle 504 and bolts 516.

By way of illustration and not limitation, FIGS. 8a–8g show alternative configurations of the trailer portion packs according to the invention when configured as a trailer. In FIG. 8a a hiker pack is formed which utilizes the traditional backpack 801. This configuration has the expected assortment of flaps, drawstring zippers and pockets that would be found in a traditional backpack 801. In FIG. 8b, a sport pack 802 utilizes the traditional backpack utility features, as found in backpack 801, and provides enhanced aerodynamic design and high-visibility colors. The configuration in FIG. 8c uses a utility pack 803 which is similar to the sport pack 802, except that utility pack 803 has chargeable and adjustable interior dividers separating it into compartments. The configuration in FIG. 8d uses a duffle pack 804 which has a top opening held in place by a flap and lower compartments which are separated from the rest of the pack. The configuration in FIG. 8e has a hardshell pack 805 which utilizes a plastic or fiberglass removable shell typically configured in two pieces. The configuration in FIG. 8f has an open rack 806 upon which items can be placed for carriage. Rack 806 typically includes openings for tie-downs, bungie cords, or other devices to hold the items being carried in place. The configuration in FIG. 8g includes a child seat 807. Such a child seat could be equipped with a windshield, leg openings, a seat and a seat belt to hold a child in place. In each of the configurations of FIGS. 8a–8g, the packs can be detachable from the frame or can be formed integrally with the frame.

While the invention has been described with respect to the one or more physical embodiments, it would be apparent to those skilled in the art that various modifications and improvements may be made without departing from the scope and spirit of the invention. Accordingly, it is to be understood that the invention is not to be limited by the specific illustrated embodiments, but only by the scope of the appended claims.

What is claimed is:

1. A support frame comprising:

a pack supporting section having a wheel attachment section therein, said wheel attachment section having means for attaching a wheel to carry said pack supporting section when said pack supporting section is attached to a vehicle;

a vehicle attachment section having a link for connecting said pack supporting section to said vehicle; and a single wheel attached to said pack supporting section, wherein said single wheel is rotatable around a longitudinal axis of said frame, into at least two positions, wherein when said single wheel is in a first of said positions said support frame is used as a pack support, and when said wheel is in a second of said positions, said support frame is attachable as a trailer to said vehicle, wherein said wheel attachment section comprises a wheel assembly and a headset, said wheel assembly including said single wheel, a wheel tongue, and a wheel post, said single wheel being connected to a first end of said wheel tongue by an axle, a second end of said wheel tongue being connected to said wheel post, said wheel post being within said headset, and wherein said headset and said wheel post each have m holes, m being an integer, and m bolts can be inserted into one each of said holes of said wheel post and one each of said holes of said headset to lock said wheel assembly into said second position.

* * * * *